United States Patent
Souchkov

(10) Patent No.: US 8,395,599 B2
(45) Date of Patent: Mar. 12, 2013

(54) LOW VOLTAGE CAPACITIVE TOUCHSCREEN CHARGE ACQUISITION AND READOUT SYSTEMS, CIRCUITS AND METHODS FOR HIGH SYSTEM NOISE IMMUNITY

(75) Inventor: Vitali Souchkov, Walnut Creek, CA (US)

(73) Assignee: Pixart Imaging, Inc., Hsin-Chu (TW)

( * ) Notice: Subject to any disclaimer, the term of this patent is extended or adjusted under 35 U.S.C. 154(b) by 125 days.

(21) Appl. No.: 13/184,132

(22) Filed: Jul. 15, 2011

(65) Prior Publication Data

US 2013/0016061 A1 Jan. 17, 2013

(51) Int. Cl.
*G06F 3/045* (2006.01)
(52) U.S. Cl. ....................................... 345/174
(58) Field of Classification Search .................. 345/174, 345/173, 660; 178/18.03
See application file for complete search history.

(56) References Cited

U.S. PATENT DOCUMENTS

| | | | |
|---|---|---|---|
| 8,054,300 B2 * | 11/2011 | Bernstein | 345/174 |
| 8,278,571 B2 * | 10/2012 | Orsley | 178/18.03 |
| 2007/0242055 A1 | 10/2007 | Lai | |
| 2009/0194344 A1 * | 8/2009 | Harley et al. | 178/18.06 |
| 2010/0328255 A1 * | 12/2010 | Ishizaki et al. | 345/174 |
| 2012/0050216 A1 * | 3/2012 | Kremin et al. | 345/174 |
| 2012/0050333 A1 * | 3/2012 | Bernstein | 345/660 |
| 2012/0092270 A1 * | 4/2012 | Lyon et al. | 345/173 |
| 2012/0105353 A1 * | 5/2012 | Brosnan | 345/174 |
| 2012/0105354 A1 * | 5/2012 | Narasimhan | 345/174 |
| 2012/0105355 A1 * | 5/2012 | Souchkov | 345/174 |
| 2012/0105356 A1 * | 5/2012 | Brosnan et al. | 345/174 |
| 2012/0105357 A1 * | 5/2012 | Li et al. | 345/174 |
| 2012/0110662 A1 * | 5/2012 | Brosnan | 726/19 |
| 2012/0268413 A1 * | 10/2012 | Narasimhan et al. | 345/174 |
| 2012/0293444 A1 * | 11/2012 | Wong et al. | 345/174 |

OTHER PUBLICATIONS

"TrueTouch™ Single-Touch Touchscreen Controller," Cypress Semiconductor Corp., Jul. 28, 2008.
"A Highly Area-Efficient Controller for Capacitive Touch Screen Panel Systems," IEEE Transactions on Consumer Electronics, pp. 1115-1122, vol. 58, No. 2, May 2010, Tong-Hun Hwang et al.
"P-181: A Charge-Share-Based Relative Read-Out Circuit for Capacitance Sensing," SID 110 Digest. pp. 1937-1938, 2010, Jang et al.
"STMicroelectronics' Product Offer for Mobile Devices," Jan. 2011.

* cited by examiner

*Primary Examiner* — Fred Tzeng
(74) *Attorney, Agent, or Firm* — McClure, Qualey & Rodack, LLP

(57) ABSTRACT

Various embodiments of capacitive touchscreen driving and sensing circuits are disclosed, where during a first phase the mutual capacitance between a given drive electrode and a given sense electrode is charged up to a first charge value corresponding substantially to a drive voltage times the mutual capacitance. During a second phase the charge storage capacitor is charged up to a value corresponding approximately to a difference in touchscreen capacitance network charges occurring during the first and second phases. The first and second phases do not overlap in time. Dark frame signals may also be acquired from the touchscreen to calibrate differences in touchscreen capacitance network charges.

39 Claims, 11 Drawing Sheets

LOW VOLTAGE CAPACITIVE TOUCHSCREEN CHARGE ACQUISITION AND READOUT SYSTEMS, CIRCUITS AND METHODS FOR HIGH SYSTEM NOISE IMMUNITY

FIELD OF THE INVENTION

Various embodiments of the invention described herein relate to the field of capacitive sensing input devices generally, and more specifically to charge acquisition or readout circuits for capacitive touchscreens and touch panels.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage (Q=CV). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded object is a finger grounded through the human body, where the body is essentially a capacitor to a surface where the electric field vanishes, and typically has a capacitance of around 100 pF.

Electrodes in self-capacitance touchpads are typically arranged in rows and columns. By scanning first rows and then columns the locations of individual capacitance changes induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE™. In mutual capacitance measurement, capacitance is measured between two conductors, as opposed to a self-capacitance measurement in which the capacitance of a single conductor is measured, and which may be affected by other objects in proximity thereto.

Low-dissipated-power integrated capacitive touch screen controllers with high system noise immunity are highly desirable in many capacitive touch screen applications. Low power dissipation and high system noise immunity typically are mutually contradictory objectives in many known capacitive touch screen controllers, however. The most successful capacitive touch screen controllers generally employ high voltage drive signals obtained from low voltage power supplies by implementing an integrated charge pump that exploits large value electric capacitors external to the integrated circuit. Most of the system noise in such controllers is in fact Electro-Magnetic Interference (or "EMI") picked up from the touch screen itself.

What is needed is a capacitive touchscreen system that employs relatively low drive voltages but retains high noise immunity.

SUMMARY

In one embodiment, there is provided a capacitive touchscreen system comprising a touchscreen, the touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, a plurality of drive circuits, each of the plurality of drive circuits being operably connected to a corresponding one of the first plurality of drive electrodes, each drive electrode being operably connected to a third switch and a fourth switch, the third switch being configured to operably connect the drive electrode to a drive voltage, the fourth switch being configured to operably connect the drive electrode to ground, each drive electrode having a drive stray capacitance associated therewith, a plurality of sense circuits, each of the plurality of sense circuits being operably connected to a corresponding one of the second plurality of sense electrodes, each sense circuit comprising a first switch, a second switch, and a charge acquisition circuit comprising a charge storage capacitor arranged in parallel with a fifth switch, the first switch being configured to operably connect the sense electrode to ground, the second switch being configured to operably connect the sense electrode to the charge acquisition circuit, each sense electrode having a sense stray capacitance associated therewith, wherein a mutual capacitance existing between a given drive electrode and a given sense electrode at a given intersection of the first and second pluralities of electrodes, the drive stray capacitance associated with the given drive electrode, and the sense stray capacitance associated with the given sense electrode together defining a capacitance touchscreen network, during a first phase the third switch is closed, the fourth switch is open, the first switch is closed, the second switch is open, a first potential of the given sense electrode corresponds to ground, and the mutual capacitance between the given drive electrode and the given sense electrode is charged up to a first charge value corresponding substantially to the drive voltage times the mutual capacitance, during a second phase the third switch is open, the fourth switch is closed, the first switch is open, the second switch is closed, a second potential of the given drive electrode corresponds to ground, and the charge storage capacitor is charged up to a value corresponding approximately to a difference in touchscreen capacitance network charges occurring during the first and second phases, the first and second phases not overlapping in time.

In another embodiment, there is provided a method of acquiring charge in a capacitive touchscreen system comprising a touchscreen, the touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, a plurality of drive circuits, each of the plurality of drive circuits being operably connected to a corresponding one of the first plurality of drive electrodes, each drive electrode being operably connected to a third switch and a fourth switch, the third switch being configured to operably connect the drive electrode to a drive voltage, the fourth switch being configured to operably connect the drive electrode to ground, each drive electrode having a drive stray capacitance associated therewith, a plurality of sense circuits, each of the plurality of sense circuits being operably connected to a corresponding one of the second plurality of sense electrodes, each sense circuit comprising a first switch, a second switch, and a charge acquisition circuit comprising a charge storage capacitor arranged in parallel with a fifth switch, the first switch being configured to operably connect the sense electrode to ground, the second switch being configured to operably connect the sense electrode to the charge acquisition circuit, each sense electrode having a sense stray capacitance associated therewith, a mutual capacitance existing between a given drive electrode and a given sense electrode at a given intersection of the first and second pluralities of electrodes, the drive stray capacitance associated with the given drive electrode, and the sense stray capacitance associated with the given sense electrode together defining a touchscreen capacitance network, the method comprising during a first phase closing the third switch, opening the fourth switch, closing the first switch, and opening the second switch, a first potential of the given sense electrode corresponding to ground, and charging a mutual capacitance between the given drive electrode and the given sense electrode up to a first charge value corresponding substantially to the drive voltage times the mutual capacitance, and during a second phase opening the third switch, closing the fourth switch, opening the first switch, and closing the second switch, a second potential of the given drive electrode corresponding to ground, and charging the charge storage capacitor up to a value corresponding approximately to a difference in touchscreen capacitance network charges occurring during the first and second phases, wherein the first and second phases do not overlap in time.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

FIG. 10($b$) shows simulation results obtained with the circuitry of FIG. 10($a$);

The drawings are not necessarily to scale. Like numbers refer to like parts or steps throughout the drawings.

DETAILED DESCRIPTIONS OF SOME EMBODIMENTS

Figure 1:
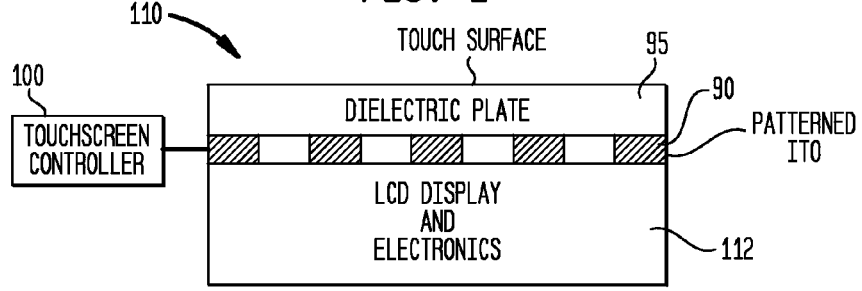
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
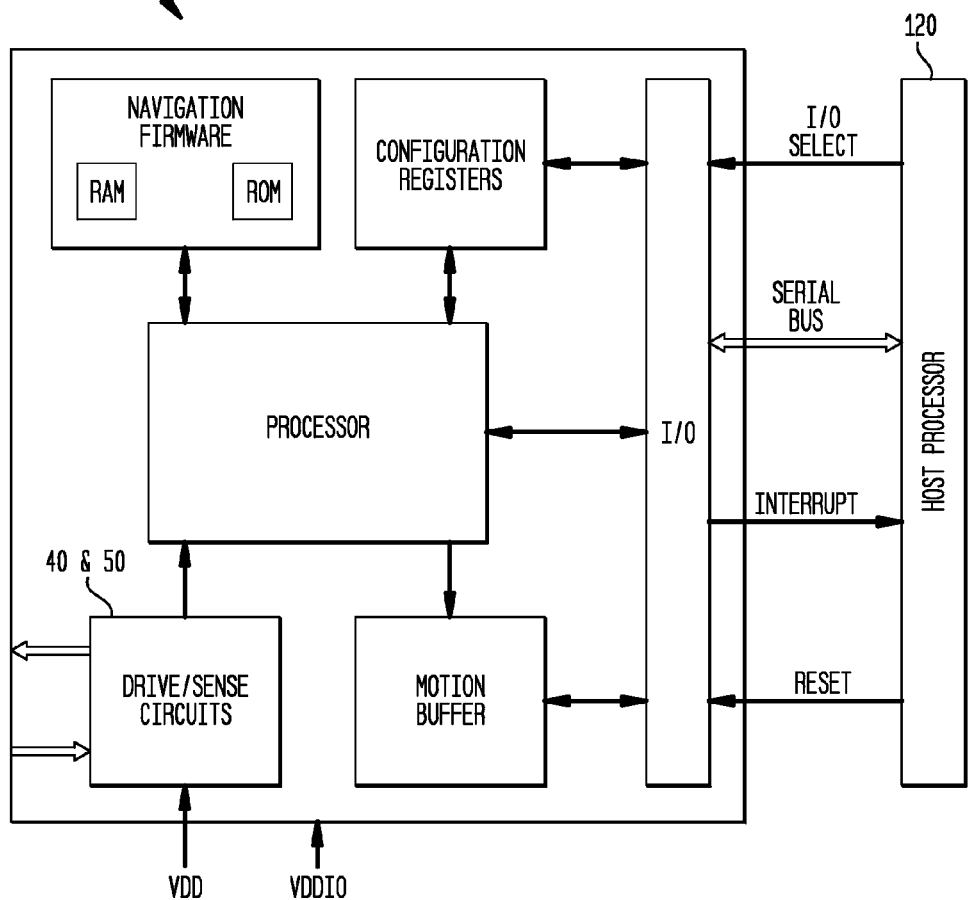
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
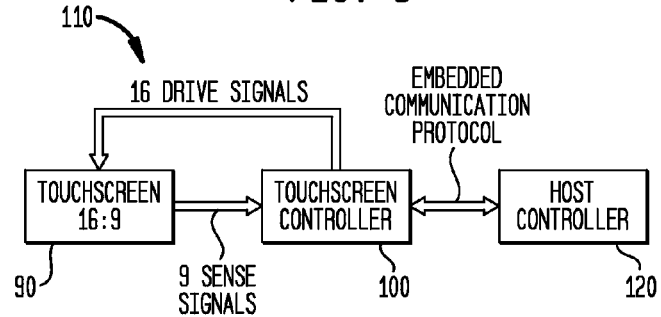
FIG. 3 shows one embodiment of a block diagram of a capacitive touchscreen system and a host controller.
Figure 4:
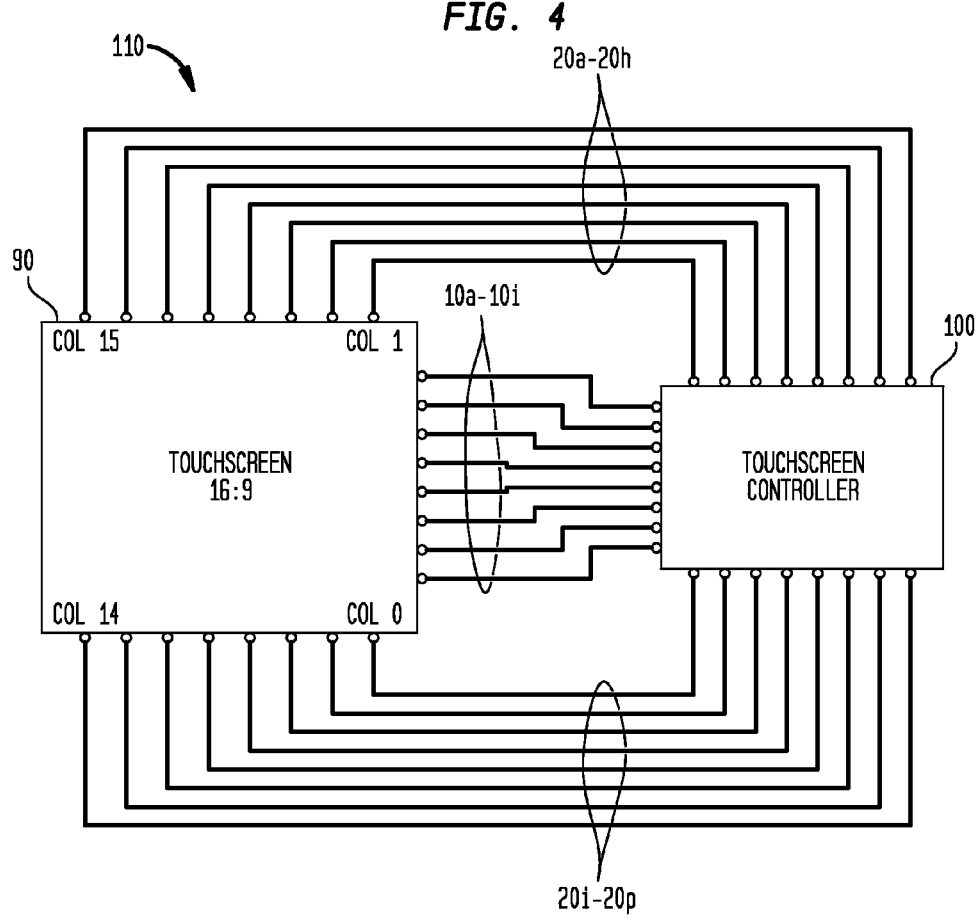
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 16 drive signal lines and 9 sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching touchscreen or touch panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are contemplated, such as 8×12 and 12×20 arrays.

Touchscreen controller 100 features multiple operating modes with varying levels of power consumption. In rest mode controller 100 periodically looks for touches at a rate programmed by the rest rate registers. There are multiple rest modes, each with successively lower power consumption. In the absence of a touch for a certain interval controller 100 automatically shifts to the next-lowest power consumption mode.

According to one embodiment, and as shown in FIG. 4, an ITO grid or other electrode configuration on touchscreen 90 comprises sense columns 20a-20p and drive rows 10a-10i, where sense columns 20a-20p are operably connected to corresponding sense circuits and rows 10a-10i are operably connected to corresponding drive circuits. One configuration for routing ITO or other drive and sense electrodes to lines to touchscreen controller 100 is shown in FIG. 4.

Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

Described herein are various embodiments of low voltage capacitive touchscreen charge acquisition and readout systems, circuits and methods that can be used to multiply touch screen signals by a factor of about two during each readout or charge acquisition cycle. For a given power supply voltage, the effective signal and signal-to-noise ratio (SNR) are doubled during each readout cycle of the capacitive touchscreen without the need to generate supplementary high drive voltages. This reduces power consumption because the electric power that would otherwise be required to generate drive signals having high voltages is not required. Because capacitive touchscreens are often employed as human interfaces to complicated devices and systems, and touchscreens and readout electronics of touchscreen controllers are often exposed to many kinds of EMI, operation of touchscreen controllers is frequently impaired by noise. The various embodiments of the low voltage capacitive touchscreen charge acquisition and readout systems, circuits and methods described herein provide low power and low voltage solutions to the many of problems induced in touchscreen controllers by EMI.

Figure 5:
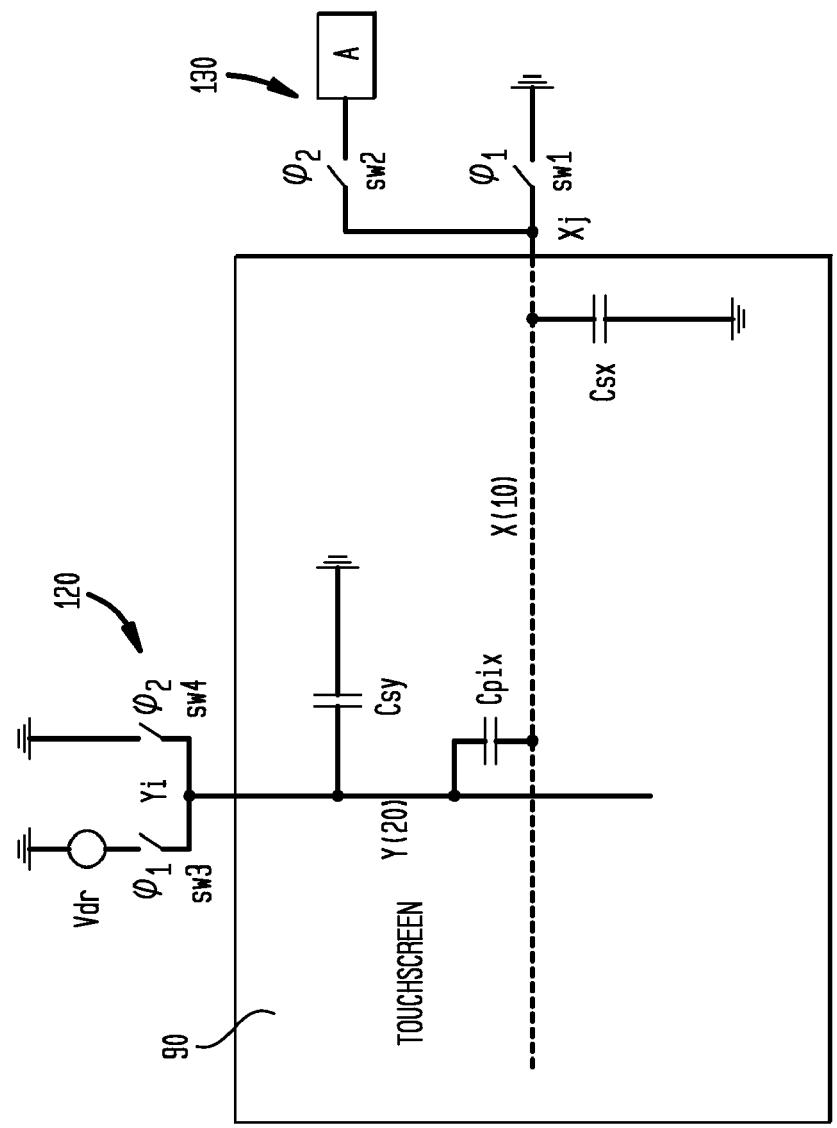
FIG. 5 shows one embodiment of a low voltage capacitive touchscreen charge acquisition and readout system and associated circuitry.

Referring now to FIG. 5, there is shown one embodiment of a low voltage capacitive touchscreen charge acquisition and readout system and its associated circuitry. Touchscreen 90 comprises a first plurality of electrically conductive drive electrodes arranged in rows or columns, and a second plurality of electrically conductive sense electrodes arranged in rows or columns arranged at an angle with respect to the rows or columns of the first plurality of electrodes.

For purposes of clarity and to avoid confusion, in FIGS. 5, 6, 8 and 9, only one drive electrode (Y or 20) and only one sense electrode (X or 10) is shown. At the intersection of the shown single drive electrode and single sense electrode a mutual capacitance Cpix exists between drive electrode Y and sense electrode X. This mutual capacitance changes in the presence of one or more fingers or touch devices brought into proximity thereto.

Drive electrode X of FIG. 1 is operably connected to one drive circuit 120 from among a plurality of drive circuits. Drive electrode 20 is further operably connected to third switch sw3 and to fourth switch sw4 of drive circuit 120. Third switch sw3 is configured to operably connect drive electrode Y to drive voltage Vdr, and fourth switch sw4 is configured to operably connect drive electrode Y to ground. As shown in FIG. 5, drive electrode Y has a drive stray capacitance associated therewith (Csy).

As further shown FIG. 5, during operation, and from among a plurality of sense circuits, one sense circuit 130 is operably connected to a corresponding one from among a second plurality of sense electrodes. As shown in FIG. 5, sense circuit 130 comprises first switch sw1, second switch sw2, and charge acquisition or readout circuit A, which comprises a charge storage capacitor Cstore (not shown in FIG. 5, but shown in FIGS. 6 and 8) arranged in parallel with fifth switch sw5 (also not shown in FIG. 5, but shown in FIGS. 6 and 8). First switch sw1 is configured to operably connect sense electrode X to ground, and second switch sw2 is configured to operably connect sense electrode X to charge acquisition or readout circuit A. Sense electrode X has a sense stray capacitance associated therewith (Csx).

Drive stray capacitance Csy associated with the given drive electrode Y of FIG. 5, sense stray capacitance Csx associated with given sense electrode X of FIG. 5, and mutual capacitance Cpix of FIG. 5 together define a touchscreen capacitance network. During operation of drive circuit 120 and sense circuit 130, and during a first phase, third switch sw3 is closed, fourth switch sw4 is open, first switch sw1 is closed, second switch sw2 is open, a first potential of given sense electrode Y corresponds to ground, and mutual capacitance Cpix between given drive electrode Y and given sense electrode X is charged up to a first charge value corresponding substantially to the drive voltage Vdr times the mutual capacitance Cpix.

Further during operation of drive circuit 120 and sense circuit 130, and during a second phase, third switch sw3 is open, fourth switch sw4 is closed, first switch sw1 is open, second switch sw2 is closed, a second potential of given drive electrode Y corresponds to ground, and the charge storage capacitor Cstore of charge acquisition or readout circuit A is charged up to a value corresponding approximately to a difference in touchscreen capacitance network charges that occur during the first and second phases, respectively, but where the first and second phases do not overlap in time, more about which is said below.

Figure 6:
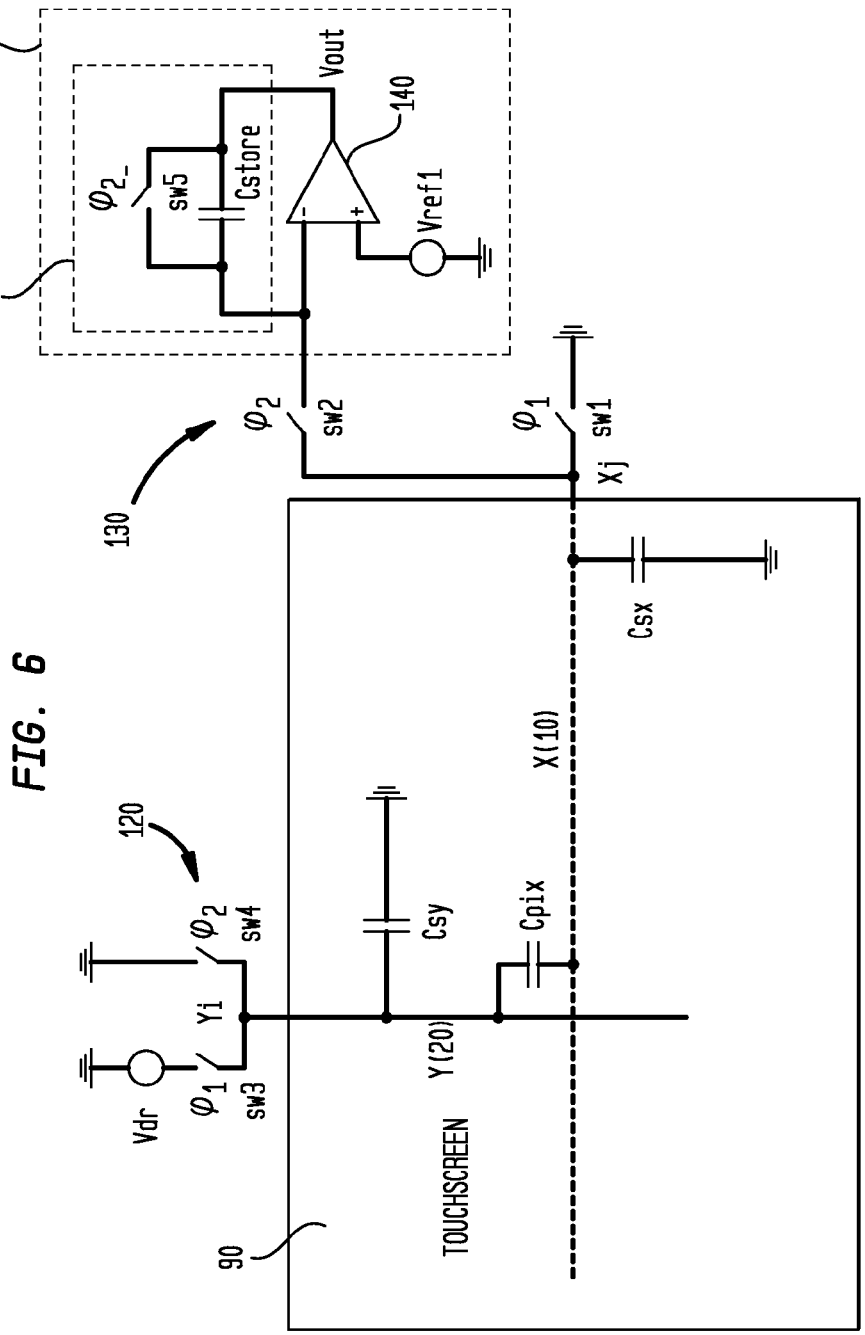
FIG. 6 shows another embodiment of a low voltage capacitive touchscreen charge acquisition and readout system and associated circuitry.
Figure 8:
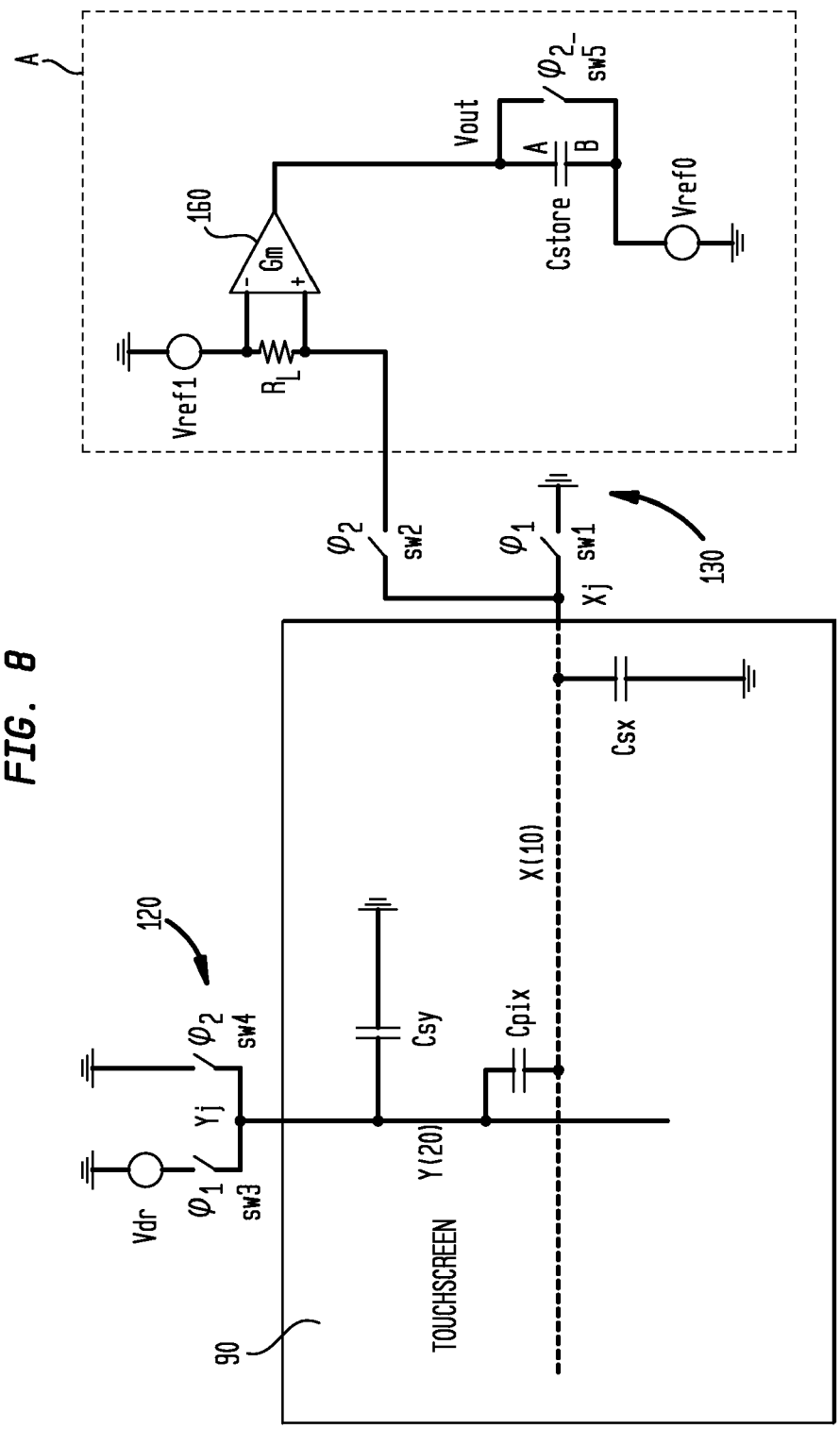
FIG. 8 shows yet another embodiment of a low voltage capacitive touchscreen charge acquisition and readout system and associated circuitry.

In one embodiment of a method corresponding to the low voltage capacitive touchscreen charge acquisition and readout system of FIGS. 5, 6 and 8, during a first phase the method comprises closing third switch sw3, opening fourth switch sw4, closing first switch sw1, and opening second switch sw2, a first potential of the given sense electrode corresponding to ground, and charging mutual capacitance Cpix between given drive electrode Y and given sense electrode X up to a first charge value corresponding substantially to the drive voltage Vdr times the mutual capacitance Cpix. During a second phase, such a method further comprises opening third switch sw3, closing fourth switch sw4, opening first switch sw1, and closing second switch sw2, a second potential of given drive electrode Y corresponding to ground, and charging the charge storage capacitor Cstore up to a value corresponding approximately to a difference in the touchscreen network charges occurring during the first and second phases, respectively, where the first and second phases do not overlap in time.

Continuing to refer to FIG. 5, touchscreen 90 comprises two sets of drive and sense electrodes disposed along Y and X axes of touchscreen 90, with an insulator located in between such sets of electrodes. Overlapping regions of the drive and sense electrodes form touch screen pixels Cpix, the electric capacitances of which change in presence of an object (usually finger or stylus) brought into proximity to the pixels. At any given moment in time, and continuing to refer to the example of FIG. 5 where a given pairing of selected drive and sense electrodes is illustrated, by applying drive voltage Vdr to drive electrode Y, the electric charge from pixel capacitance Cpix detected at corresponding sense electrode X is subsequently used to derive information regarding object position. Capacitances Csy and Csx correspond to drive and sense electrode stray capacitances to system ground, where drive and sense electrodes Y and X are operably connected to capacitive touch screen controller 100 through terminals Yi and Xj. At such terminals, and according to one embodiment, conductors are split into two branches, where each branch may be connected to an internal circuit of controller 100 using switches sw1-sw4. As further shown in FIG. 5, switches sw1 through sw4 connected to the drive and sense line terminals are controlled by logic signals φ1 and φ2, which are employed to connect drive and sense electrodes Y and X during signal acquisition phases corresponding thereto to certain electric potentials, or to charge acquisition or readout circuit A residing in touchscreen controller 100.

According to one embodiment, and as shown in FIG. 6, gated integrator circuit A may be employed to acquire or readout charge signals, which comprises operational amplifier 140, feedback loop 150, and reference voltage source Vref1.

Figure 7:
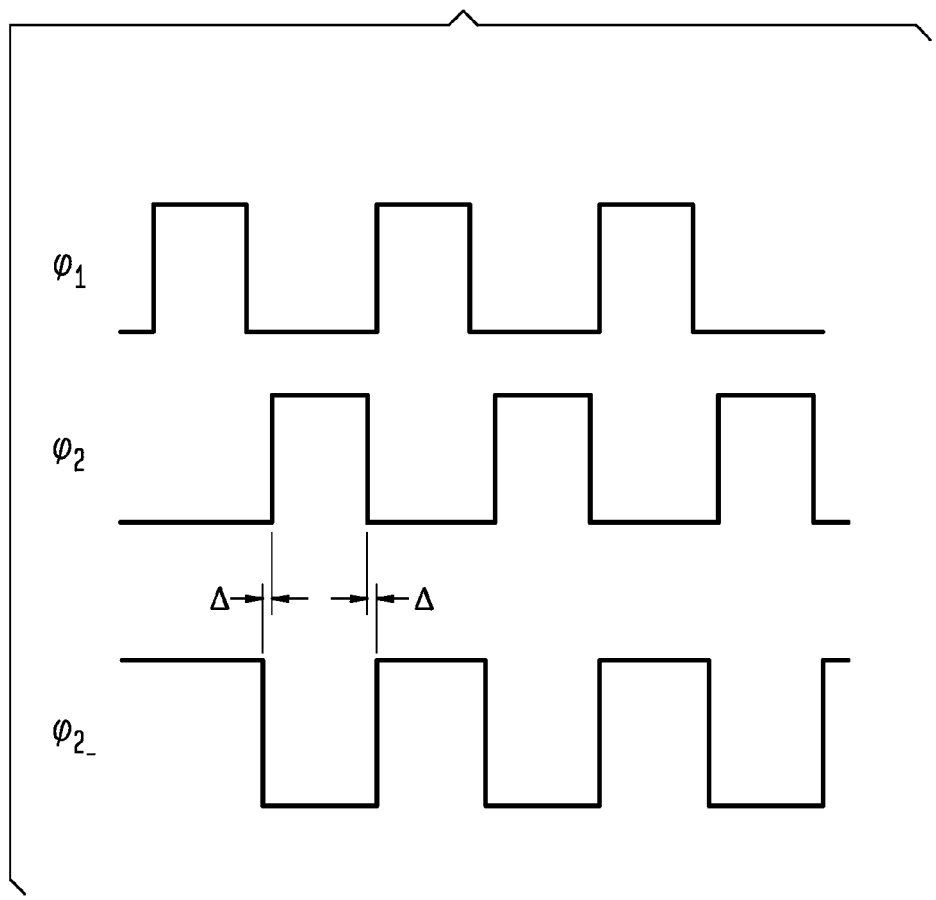
FIG. 7 shows one embodiment of a protocol for control signals.

One embodiment of a control signal protocol that supports charge signal acquisition for a given pixel on touchscreen 90 is shown in FIG. 7. Normally open switches sw1-sw4 are closed when control signals go to a logical high state. Continuing to refer to FIG. 7, a charge signal acquisition process or method corresponding to the circuit of FIG. 6 is now described. During a first phase, control signal φ1 goes to a logical high state, while control signal φ2 remains at a logical low state. Switch sw1 therefore connects sense electrode X to system ground while switch sw3 connects drive electrode Y to drive voltage Vdr and pixel capacitor Cpix charges up to charge Q1=−CpixVdr (assuming sense electrode X is the top electrode of pixel capacitor Cpix). After control signal φ1 returns to a logical low state, gated integrator switch sw5 of charge acquisition circuit A is turned off by control signal φ2_going to a logical low state. Turning on switches sw2 and sw4 using control signal φ2 going to a logical high state is delayed by time Δ so that the trailing edge of φ2_and the rising edge of φ2 do not coincide. In other words, the first and second phases do not overlap in time. During the second or charge acquisition phase corresponding to control signal φ2 in a logical high state, feedback capacitor Cstore of the gated integrator circuit is charged up so that the output voltage of the gated integrator may be determined using charge conservation of the charged sense electrode as follows:

$$C_{pix}(0-V_{dr})=C_{pix}(V_{ref1}-0)+C_{sx}(V_{ref1}-0)+C_{store}(V_{ref1}-V_{out}) \quad (1)$$

where Vref1—reference voltage used by the gated integrator circuit, Vout, is the output voltage of the gated integrator. The voltage difference at the gated integrator output before and after the signal acquisition then becomes:

$$V_{out}-V_{ref1}=-\frac{C_{pix}(V_{dr}+V_{ref1})+C_{sx}V_{dr}}{C_{store}} \quad (2)$$

The integrator circuit's virtual ground voltage Vref1 may approach or exceed Vdr, which may be defined by the necessary voltage swing of the gated integrator circuit's output. The signal corresponding to the charge of the sense electrode $C_{sx}V_{dr}$ may be used as the reference 'floor' for the detected pixel charge Cpix(Vdr+Vref1). As a result, the detected charge may be doubled in comparison to conventional driving of the Y electrode without charge storage in pixel capacitance Cpix. The 'floor' or dark frame signal may be acquired when the pixel is not charged, and may then be subtracted from the pixel signal (see equation 2), more about which is said below.

Another embodiment of a charge acquisition or readout circuit is shown in FIG. 8, where the second phase is controlled by control signal φ2, and sense electrode Y is connected to load resistor, which in turn is connected to voltage Vref1. The voltage drop across load resistor, is sensed by transconductance amplifier 160 having gain Gm, the output of which is loaded into capacitor Cstore, which is configured to acquire charge through the operation of control signal φ2_. In the embodiment of charge acquisition or readout circuit A shown in FIG. 8, the power supply for the transconductance amplifier may be provided by a few tenths of millivolts higher than Vref1 (the MOS transistor saturation voltage), which permits approximate doubling of the SNR compared to using a conventional driver circuit that would otherwise employ a higher power supply voltage. In addition, in the embodiment of charge acquisition circuit A shown in FIG. 8, an integrator circuit is no longer necessary so that a simple storage capacitor with a switch may be used to provide temporary signal storage before further signal processing occurs.

In the circuit of FIG. 8, the voltage amplitude of storage capacitor Cstore at the end of a charge acquisition cycle may be expressed as follows:

$$V_{out}-V_{ref0}=G_mR_L\frac{C_{pix}(V_{dr}+V_{ref1})+C_{sx}V_{ref1}}{C_{store}} \quad (3)$$

Figure 9:
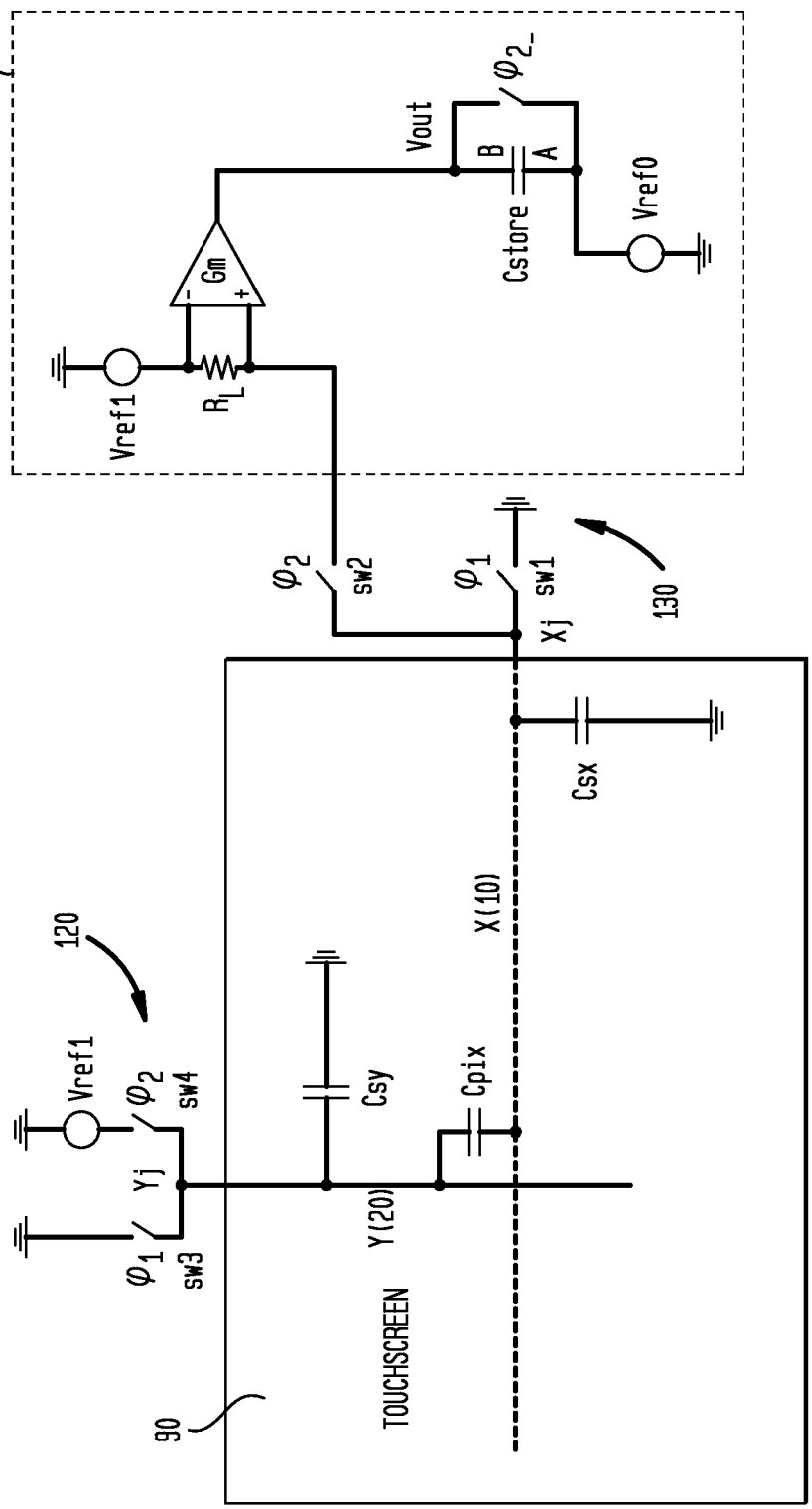
FIG. 9 shows one embodiment of a low voltage capacitive touchscreen dark frame signal acquisition and readout system and associated circuitry.

Referring now to FIG. 9, there is shown one embodiment of circuitry configured to acquire so-called "dark frame" data from touchscreen 90, which can then be employed to calibrate charge signals that have been acquired from touchscreen 90. By applying an acquisition control protocol similar to that shown in FIG. 7, drive and sense electrode terminals in FIG. 9 are sequentially connected to obtain "floor" or dark frame signals through charge acquisition or readout circuit A. The dark frame output signal for each pixel may be expressed as follows:

$$V_{out\_dark} - V_{ref0} = G_m R_L \frac{C_{sx} V_{ref1}}{C_{store}} \quad (4)$$

By subtracting dark frame output signals from pixel signals (the right-hand portion of expression 4, which is derived from the right-hand portion of expression 3), the net pixel signal may be obtained. FIG. 9 shows circuitry that provides very simple means and methods of subtracting dark frame signals from pixel signals by flipping the connection of the plates corresponding to capacitor Cstore in circuit A during a "dark frame" signal acquisition cycle.

Figure 10A:
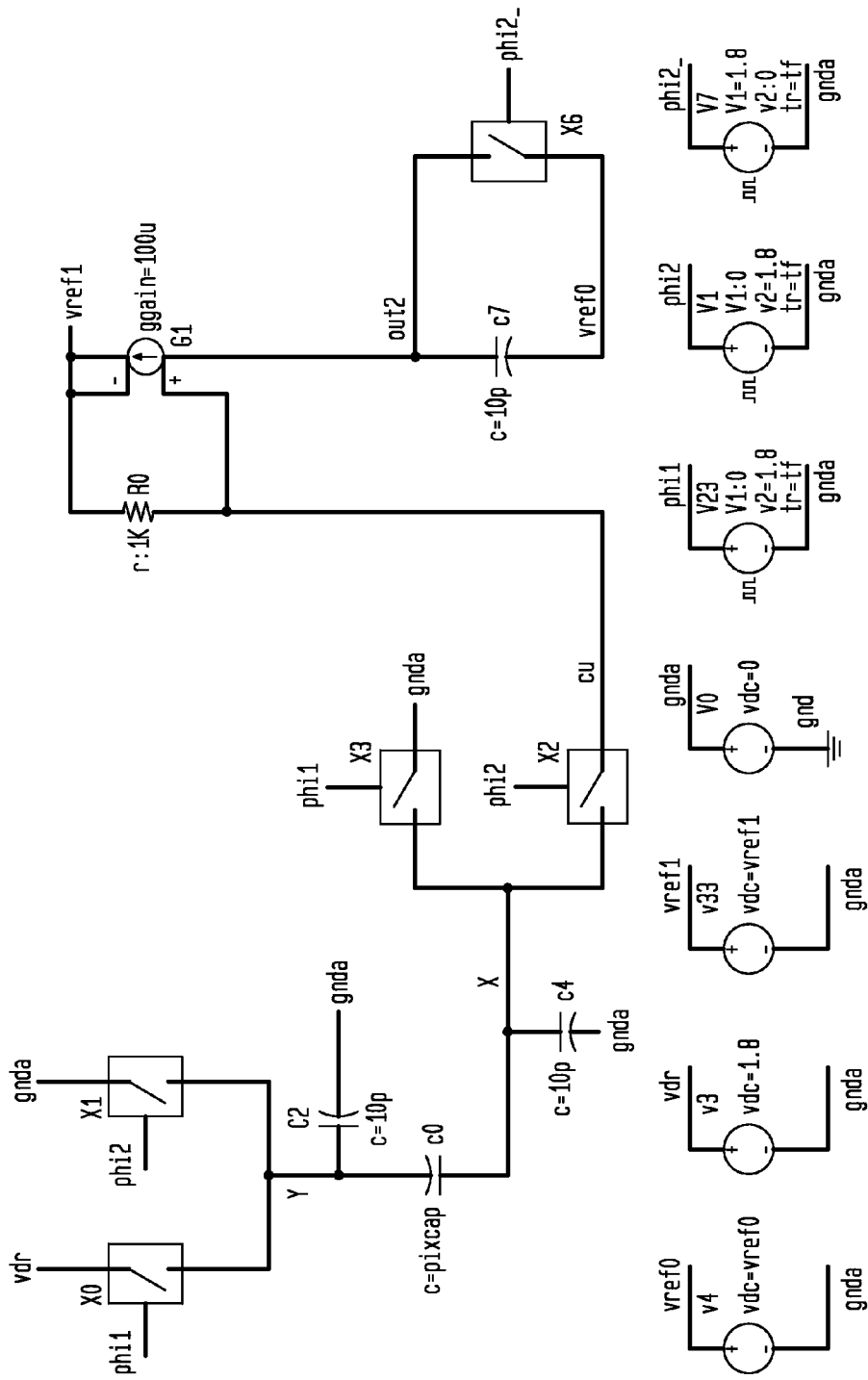
FIG. 10($a$) shows one embodiment of a detailed schematic corresponding to the charge acquisition circuitry of FIG. 8.

FIG. 10(a) shows one embodiment of a detailed schematic corresponding to the charge acquisition circuitry of FIG. 8. The control signal designations shown in FIG. 10(a) are relatively straightforward, where phi1 corresponds to φ1, phi2 corresponds to φ2, and phi2_corresponds—φ2_. Capacitors C2 and C4 correspond to stray capacitances Csy and Csx are chosen to have values of 10 pF.

Figure 10B:
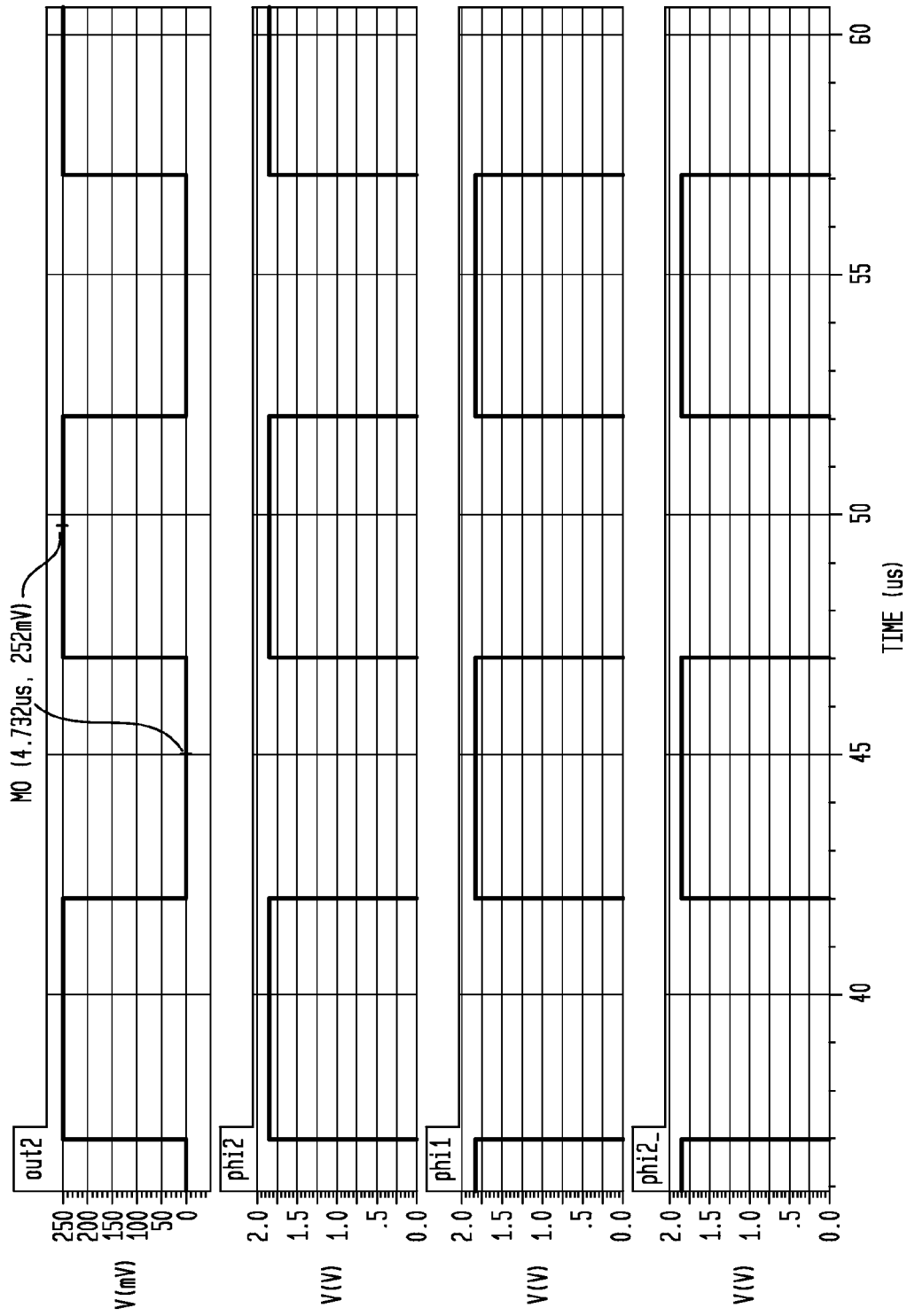

Simulation results for the circuitry of FIG. 10(a) are shown in FIG. 10(b), where Cpix=2 pF, Cstore corresponds to C7=10 pF, and the transconductance value Gm=10$^{-4}$ [1/Ohm] and resistor=1 KOhm. In FIG. 10(b), corresponding control signals are shown along with the simulated output presented at the circuit's output terminals ('out2'). It will be seen that for the selected voltage reference potentials Vdr=Vref1=1.8 V, and Vref0=0 V the simulated results match the analytical results of expression 3.

Figure 11A:
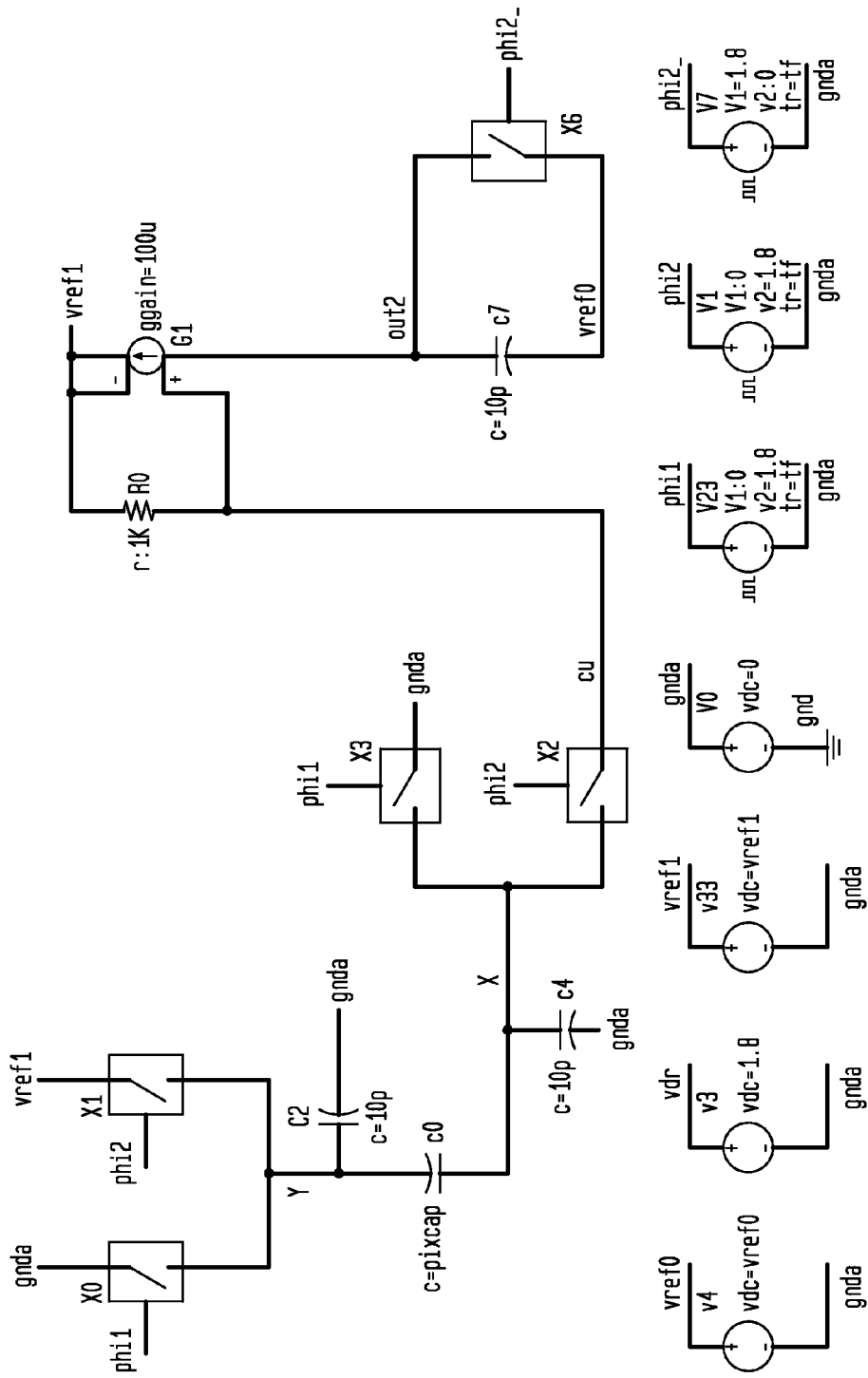
FIG. 11($a$) shows one embodiment of a detailed schematic corresponding to the dark frame signal acquisition circuitry of FIG. 9, and FIG. 11($b$) shows simulation results obtained with the circuitry of FIG. 11($a$).
Figure 11B:
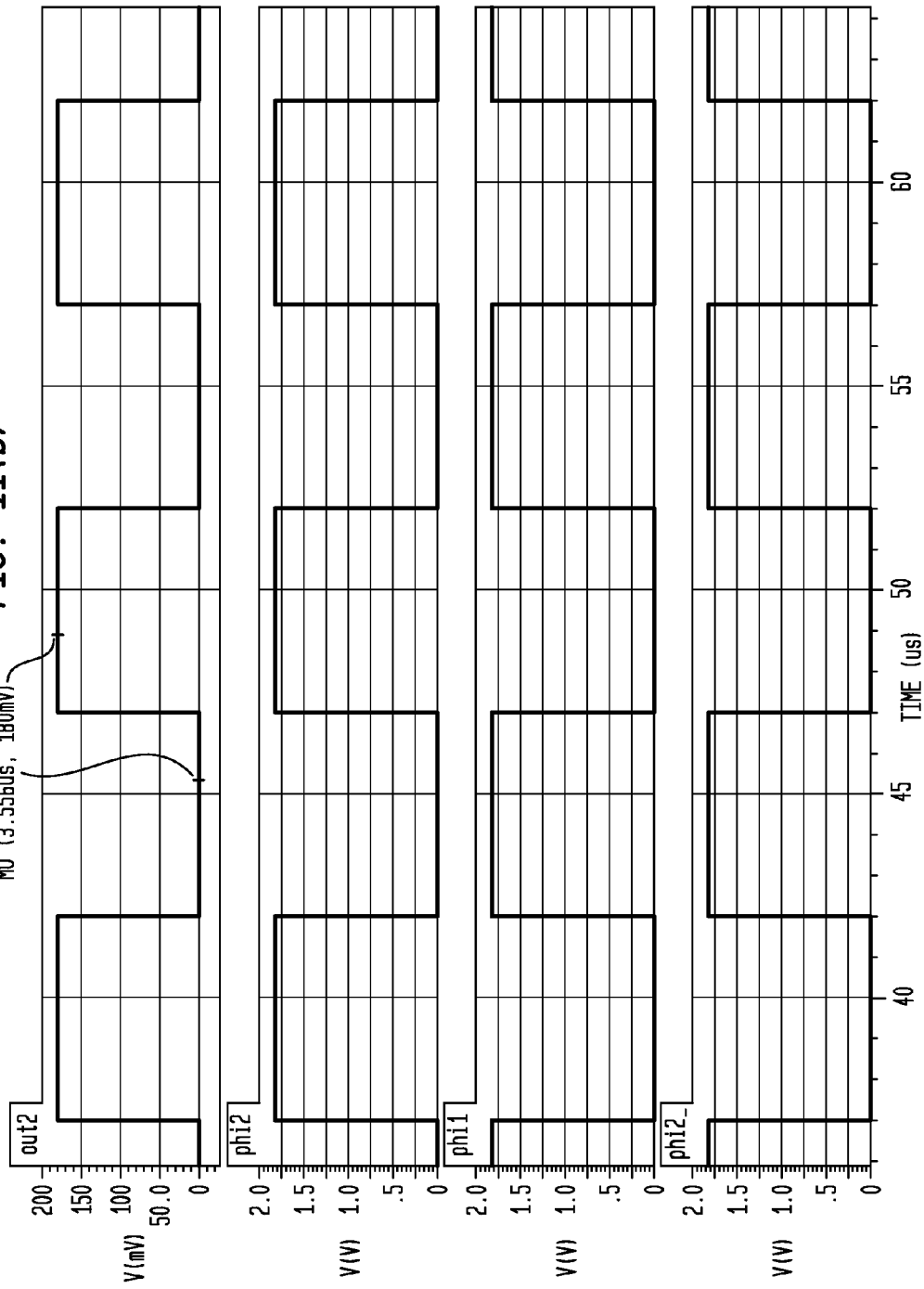

Referring now to FIG. 11(a), there is shown one embodiment of a detailed schematic corresponding to the dark frame signal acquisition circuitry of FIG. 9 that was also simulated, the results for which are shown in FIG. 11(b). It will be seen that the simulated results shown in FIG. 11(b) match the analytical results given by expression 4 for the selected circuit parameters.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

I claim:

1. A capacitive touchscreen system, comprising:
a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto;
a plurality of drive circuits, each of the plurality of drive circuits being operably connected to a corresponding one of the first plurality of drive electrodes, each drive electrode being operably connected to a third switch and a fourth switch, the third switch being configured to operably connect the drive electrode to a drive voltage, the fourth switch being configured to operably connect the drive electrode to ground, each drive electrode having a drive stray capacitance associated therewith;
a plurality of sense circuits, each of the plurality of sense circuits being operably connected to a corresponding one of the second plurality of sense electrodes, each sense circuit comprising a first switch, a second switch, and a charge acquisition circuit comprising a charge storage capacitor arranged in parallel with a fifth switch, the first switch being configured to operably connect the sense electrode to ground, the second switch being configured to operably connect the sense electrode to the charge acquisition circuit, each sense electrode having a sense stray capacitance associated therewith;
wherein a mutual capacitance existing between a given drive electrode and a given sense electrode at a given intersection of the first and second pluralities of electrodes, the drive stray capacitance associated with the given drive electrode, and the sense stray capacitance associated with the given sense electrode together defining a capacitance touchscreen network, during a first phase the third switch is closed, the fourth switch is open, the first switch is closed, the second switch is open, a first potential of the given sense electrode corresponds to ground, and the mutual capacitance between the given drive electrode and the given sense electrode is charged up to a first charge value corresponding substantially to the drive voltage times the mutual capacitance, during a second phase the third switch is open, the fourth switch is closed, the first switch is open, the second switch is closed, a second potential of the given drive electrode corresponds to ground, and the charge storage capacitor is charged up to a value corresponding approximately to a difference in touchscreen capacitance network charges occurring during the first and second phases, the first and second phases not overlapping in time.

2. The capacitive touchscreen system of claim 1, wherein the charge acquisition circuit comprises an operational amplifier.

3. The capacitive touchscreen system of claim 2, wherein the operational amplifier comprises a positive input terminal, a negative input terminal, and an output terminal.

4. The capacitive touchscreen system of claim 3, wherein the positive input terminal is connected to a first reference voltage.

5. The capacitive touchscreen system of claim 3, wherein the negative input terminal is operably connected to the second switch.

6. The capacitive touchscreen system of claim 2, wherein the operational amplifier comprises a feedback loop operably connected to a negative input terminal and an output terminal thereof.

7. The capacitive touchscreen system of claim 6, wherein the fifth switch and charge storage capacitor are included in the feedback loop.

8. The capacitive touchscreen system of claim 1, wherein the charge acquisition circuit comprises a transconductance amplifier.

9. The capacitive touchscreen system of claim 8, wherein the transconductance amplifier comprises a positive input terminal, a negative input terminal, and an output terminal.

10. The capacitive touchscreen system of claim 9, wherein the negative input terminal is connected to a first reference voltage.

11. The capacitive touchscreen system of claim 9, wherein the positive input terminal is operably connected to the second switch.

12. The capacitive touchscreen system of claim 9, wherein the positive and negative input terminals are connected to one another through a load resistor.

13. The capacitive touchscreen system of claim 9, wherein the fifth switch and charge storage capacitor are operably connected to the output terminal.

14. The capacitive touchscreen system of claim 13, wherein the fifth switch and charge storage capacitor are operably connected to a second reference voltage.

15. The capacitive touchscreen system of claim 1, wherein operation of the first, second, third, fourth and fifth switches is controlled by a touchscreen controller operably connected to the sense circuit and the drive circuit.

16. The capacitive touchscreen system of claim 15, wherein the touchscreen controller is configured to provide first digital control signals to the first and third switches.

17. The touchscreen system of claim 15, wherein the touchscreen controller is further configured to provide a second digital control signal to the second and fourth switches.

18. The touchscreen system of claim 15, wherein the touchscreen controller is configured to provide a third digital control signal to the fifth switch.

19. The touchscreen system of claim 15, wherein the given sense circuit further comprises a dark frame charge acquisition circuit configured to acquire a dark frame signal corresponding to the given intersection.

20. A method of acquiring charge in a capacitive touchscreen system comprising a touchscreen, the touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers or touch devices brought into proximity thereto, a plurality of drive circuits, each of the plurality of drive circuits being operably connected to a corresponding one of the first plurality of drive electrodes, each drive electrode being operably connected to a third switch and a fourth switch, the third switch being configured to operably connect the drive electrode to a drive voltage, the fourth switch being configured to operably connect the drive electrode to ground, each drive electrode having a drive stray capacitance associated therewith, a plurality of sense circuits, each of the plurality of sense circuits being operably connected to a corresponding one of the second plurality of sense electrodes, each sense circuit comprising a first switch, a second switch, and a charge acquisition circuit comprising a charge storage capacitor arranged in parallel with a fifth switch, the first switch being configured to operably connect the sense electrode to ground, the second switch being configured to operably connect the sense electrode to the charge acquisition circuit, each sense electrode having a sense stray capacitance associated therewith, a mutual capacitance existing between a given drive electrode and a given sense electrode at a given intersection of the first and second pluralities of electrodes, the drive stray capacitance associated with the given drive electrode, and the sense stray capacitance associated with the given sense electrode together defining a touchscreen capacitance network, the method comprising:

during a first phase closing the third switch, opening the fourth switch, closing the first switch, and opening the second switch, a first potential of the given sense electrode corresponding to ground, and charging a mutual capacitance between the given drive electrode and the given sense electrode up to a first charge value corresponding substantially to the drive voltage times the mutual capacitance, and during a second phase opening the third switch, closing the fourth switch, opening the first switch, and closing the second switch, a second potential of the given drive electrode corresponding to ground, and charging the charge storage capacitor up to a value corresponding approximately to a difference in touchscreen capacitance network charges occurring during the first and second phases;

wherein the first and second phases do not overlap in time.

21. The method of claim 20, further comprising employing an operational amplifier in the charge acquisition circuit.

22. The method of claim 21, wherein the operational amplifier comprises a positive input terminal, a negative input terminal, and an output terminal.

23. The method of claim 22, wherein the positive input terminal is connected to a first reference voltage.

24. The method of claim 22, wherein the negative input terminal is operably connected to the second switch.

25. The method of claim 22, wherein the operational amplifier comprises a feedback loop operably connected to a negative input terminal and an output terminal thereof.

26. The method of claim 25, wherein the fifth switch and charge storage capacitor are included in the feedback loop.

27. The method of claim 22, wherein the fifth switch and charge storage capacitor are operably connected to a second reference voltage.

28. The method of claim 20, further comprising employing a transconductance amplifier in the charge acquisition circuit.

29. The method of claim 28, wherein the transconductance amplifier comprises a positive input terminal, a negative input terminal, and an output terminal.

30. The method of claim 29, wherein the negative input terminal is connected to a first reference voltage.

31. The method of claim 29, wherein the positive input terminal is operably connected to the second switch.

32. The method of claim 29, wherein the positive and negative input terminals are connected to one another through a load resistor.

33. The method of claim 29, wherein the fifth switch and charge storage capacitor are operably connected to the output terminal.

34. The method of claim 20, wherein operation of the first, second, third, fourth and fifth switches is controlled by a touchscreen controller operably connected to the sense circuit.

35. The method of claim 34, wherein the touchscreen controller is configured to provide first digital control signals to the first and third switches that are in a high logical state when the drive signal is high and that are in a low logical state when the drive signal is low.

36. The method of claim 34, wherein the touchscreen controller is further configured to provide a second digital control signal to the second and fourth switches that is in a high logical state after trailing edges of one high drive signal and before leading edges of a following high drive signal.

37. The method of claim 34, wherein the touchscreen controller is configured to provide a third digital control signal to the fifth switch that is in a high logical state over at least portions of time when the drive signal is high.

38. The method of claim 20, further comprising acquiring a dark frame signal corresponding to the given intersection.

39. The method of claim 38, further comprising subtracting the dark frame signal from the difference in touchscreen capacitance network charges.

* * * * *